(12) United States Patent
Lin

(10) Patent No.: US 9,312,757 B2
(45) Date of Patent: Apr. 12, 2016

(54) OUTPUT VOLTAGE ADJUSTABLE CHARGE PUMP

(71) Applicant: eGalax_eMPIA Technology Inc., Taipei (TW)

(72) Inventor: Po-Chuan Lin, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 14/585,772

(22) Filed: Dec. 30, 2014

(65) Prior Publication Data
US 2015/0188420 A1  Jul. 2, 2015

(30) Foreign Application Priority Data
Dec. 31, 2013  (TW) .............................. 102149341 A

(51) Int. Cl.
*G05F 1/10* (2006.01)
*G05F 3/02* (2006.01)
*H02M 3/07* (2006.01)

(52) U.S. Cl.
CPC ...................................... *H02M 3/07* (2013.01)

(58) Field of Classification Search
CPC . H02M 3/073; H02M 3/07; H02M 2003/077; G11C 5/145; G05F 3/205
USPC ......................................................... 327/536
See application file for complete search history.

(56) References Cited

U.S. PATENT DOCUMENTS

| | | | |
|---|---|---|---|
| 2007/0216620 A1* | 9/2007 | Nagai et al. ...................... | 345/87 |
| 2012/0249223 A1* | 10/2012 | Neugebauer .................. | 327/536 |

* cited by examiner

*Primary Examiner* — Quan Tra
(74) *Attorney, Agent, or Firm* — Muncy, Geissler, Olds & Lowe, P.C.

(57) ABSTRACT

A charge pump that uses a control unit of a chip to adjust the on/off status of power switches and capacitor boost switches of a change-over switch set, enabling input voltage to be boosted by selected capacitors to the desired voltage level subject to conduction and cutoff of selected transistors, and therefore a predetermined voltage level of output voltage can be provided to an internal working circuit of an electronic apparatus without changing the circuit layout of the chip and the package substrate that is packaged on the chip, and thus, the chip and the package substrate simply need to be verified once, eliminating further verification procedure and time prior to vending and saving much the cost.

4 Claims, 5 Drawing Sheets

US 9,312,757 B2

OUTPUT VOLTAGE ADJUSTABLE CHARGE PUMP

This application claims the priority benefit of Taiwan patent application number 102149341, filed on Dec. 31, 2013.

BACKGROUND OF THE INVENTION

1. Field of the Invention

The present invention relates to charge pump technology, and more particularly, to an output voltage adjustable charge pump for amplifying an input voltage to provide the desired output voltage.

2. Description of the Related Art

In a notebook computer, tablet computer, smart phone or any other electronic apparatus, an IC with charge pump is generally used for amplifying the input voltage to provide a high level of output voltage for the working of an internal working circuit.

FIG. 4 illustrates a charge pump according to the prior art. According to this design, the charge pump comprises a chip A1 and a package substrate A2 packaged on the chip A1. The chip A1 comprises a clock generator A11 and $1^{st}$ through $9^{th}$ transistors $M_1$~$M_9$. The clock generator A11 is capable of generating a first clock pulse CK1 and a reversed second clock pulse CK2. When at the high voltage level, the first clock pulse CK1 and the second clock pulse CK2 have the voltage of $V_{DD}$. When at the low voltage level, the first clock pulse CK1 and the second clock pulse CK2 have zero volt. Further, the $1^{st}$ through $9^{th}$ transistors $M_1$~$M_9$ have a threshold voltage $V_t$. The charge pump is used in a circuit board A3 that comprises an input voltage $V_{in}$ of voltage level $V_{DD}$, $1^{st}$ through $8^{th}$ capacitors $C_1$~$C_8$, and a voltage stabilizer capacitor $C_{ext}$.

During charging period for the $1^{st}$ capacitor $C_1$, the first clock pulse CK1 and the second clock pulse CK2 are respectively at the low voltage level and the high voltage level, and therefore the even number transistors $M_2$, $M_4$, $M_6$ and $M_8$ are cut off, and the odd number transistors $M_1$, $M_3$, $M_5$, $M_7$ and $M_9$ are conducted. At this time, the $V_{DD}$ input voltage $V_{in}$ is transmitted through the $1^{st}$ transistor M1 to produce a threshold $V_t$ voltage drop, a voltage of $V_{DD}$-$V_t$ is produced at one end of the $1^{st}$ capacitor $C_1$, and the other end of the $1^{st}$ capacitor $C_1$ receives zero volt from the first clock pulse CK1, and thus the $1^{st}$ capacitor $C_1$ is charged to the voltage level of $V_{DD}$-$V_t$.

During boosting period for the $1^{st}$ capacitor $C_1$, the first clock pulse CK1 and the second clock pulse CK2 are respectively at the high voltage level and the low voltage level, therefore the odd number transistors $M_1$, $M_3$, $M_5$, $M_7$ and $M_9$ are cut off, and the even number transistors $M_2$, $M_4$, $M_6$ and $M_8$ are conducted. At this time, one end of the $1^{st}$ capacitor $C_1$ receives the voltage of $V_{DD}$ from the first clock pulse CK1. Because the $1^{st}$ capacitor $C_1$ has stored therein voltage of $V_{DD}$-$V_t$, the other end of the $1^{st}$ capacitor $C_1$ has a voltage of $2V_{DD}$-$V_t$ that is transmitted through the $2^{nd}$ transistor $M_2$ to produce a threshold $V_t$ voltage drop, and a voltage of $2\times(V_{DD}$-$V_t)$ is produced at one end of the $2^{nd}$ capacitor $C_2$, and the other end of the $2^{nd}$ capacitor $C_2$ receives the voltage of zero volt from the second clock pulse CK2, and therefore the $2^{nd}$ capacitor $C_2$ is charged to $2\times(V_{DD}$-$V_t)$.

Subject to the aforesaid manner, the voltages of capacitors $C_3$~$C_8$ can be regulated, enabling the emitter of the $9^{th}$ transistor $M_9$ to provide an output voltage $V_{out}$ of $9\times(V_{DD}$-$V_t)$ that is then stabilized by the voltage stabilizer capacitor $C_{ext}$ and then outputted to the internal working circuit A4 of the electronic apparatus.

However, from the circuit diagram of the prior art design shown in FIG. 5, it can be seen that if the desired working voltage for the working circuit A4 is $5\times(V_{DD}$-$V_t)$, the chip A1 must have $1^{st}$ through $5^{th}$ transistors $M_1$~$M_5$ built therein to match with $1^{st}$ through $4^{th}$ capacitors $C_1$~$C_4$ of the circuit board A3 for generating $5\times(V_{DD}$-$V_t)$ output voltage, i.e., a different chip A1 of a different specification must be used with the circuit board A3 for generating a different working voltage, for example, $1^{st}$ through $9^{th}$ transistors $M_1$~$M_9$ of the chip A1 are used to match with $1^{st}$ through $8^{th}$ capacitors $C_1$~$C_8$ of the circuit board A3 for generating $9\times(V_{DD}$-$V_t)$ output voltage, or $1^{st}$ through $5^{th}$ transistors $M_1$~$M_5$ of the chip A1 are used to match with $1^{st}$ through $4^{th}$ capacitors $C_1$~$C_4$ of the circuit board A3 for generating $5\times(V_{DD}$-$V_t)$ output voltage. Therefore, one specification of prior art charge pump can simply provide one output voltage $V_{out}$ for the working circuit A4 of the electronic apparatus. When intending to use the charge pump in a different electronic apparatus that requires a different working voltage, the internal circuit layout of the chip A1 and the wiring of the package substrate A2 must be relatively modified. Before vending of different specifications of chips A1, these chips A1 must be verified individually through an IC verification process before acceptance. The verification must be performed on the chip A1 as well as the package substrate A2. If the circuit design of the chip A1 or the wiring between the chip A1 and the package substrate A2 is changed, a new verification must be performed. Thus, preparing multiple chips A1 of different specifications for different applications to meet different requirements for providing different output voltages requires multiple verification procedures and long operating time, increasing the cost.

Therefore, it is desirable to provide a charge pump that eliminates the drawbacks of the aforesaid prior art design.

SUMMARY OF THE INVENTION

The present invention has been accomplished under the circumstances in view. It is therefore the main object of the present invention to provide a charge pump for amplifying an input voltage to provide the desired output voltage, which simply needs the chip and the package substrate simply to be verified once, eliminating further verification procedure and operating time prior to vending.

To achieve this and other objects of the present invention, a charge pump of the invention comprises a chip comprising a clock generator, a first clock terminal, a second clock terminal, a transistor set, a change-over switch set, a control unit, an input terminal set and an output terminal, and a package substrate comprising a first clock pin, a second clock pin, an external pin set and a power output pin and packaged on the chip. The control unit of the chip controls On/Off status of the power switches and capacitor boost switches of the change-over switch set, enabling the input voltage to be boosted to the desired voltage level subject to conduction and cutoff of selected transistors, and thus the desired voltage level of output voltage can be obtained and provided to a working circuit.

DETAILED DESCRIPTION OF THE PREFERRED EMBODIMENT

In the following description, the terminology of "first", "second", $(X-1)^{th}$, $X^{th}$, $(Y-1)^{th}$ and $Y^{th}$ are adapted for indentifying the indicated components, for example, the first transistor $M_1$, second transistor $M_2$, $(X-1)^{th}$ transistor $M_{x-1}$ and $X^{th}$ transistor $M_x$ of the transistor set 14 and the $(Y-1)^{th}$ capacitor $C_{Y-1}$ and $Y^{th}$ capacitor $C_Y$ of the capacitor set 31, but not intended to limit the scope of the present invention.

Figure 1:
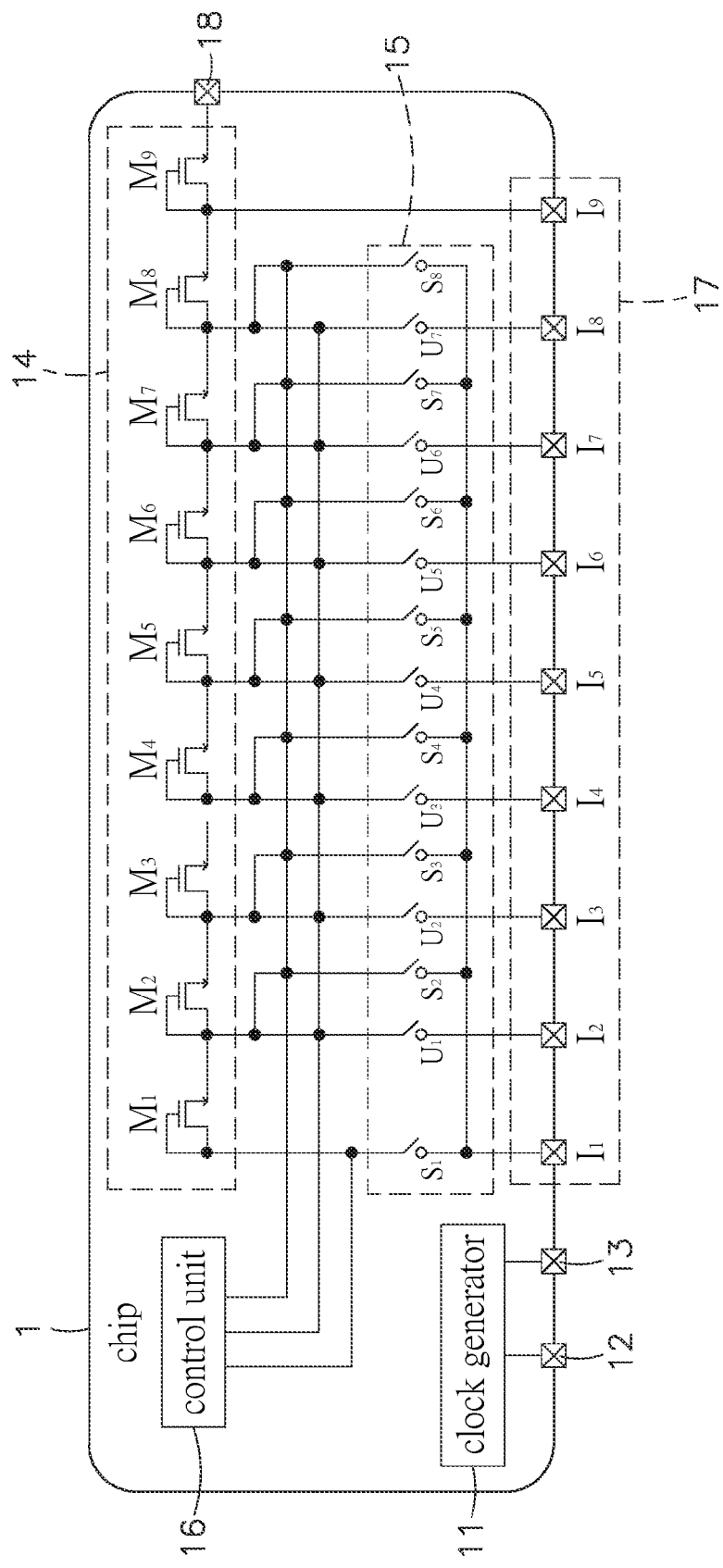
FIG. 1 is a circuit diagram of a chip for charge pump in accordance with the present invention.
Figure 2:
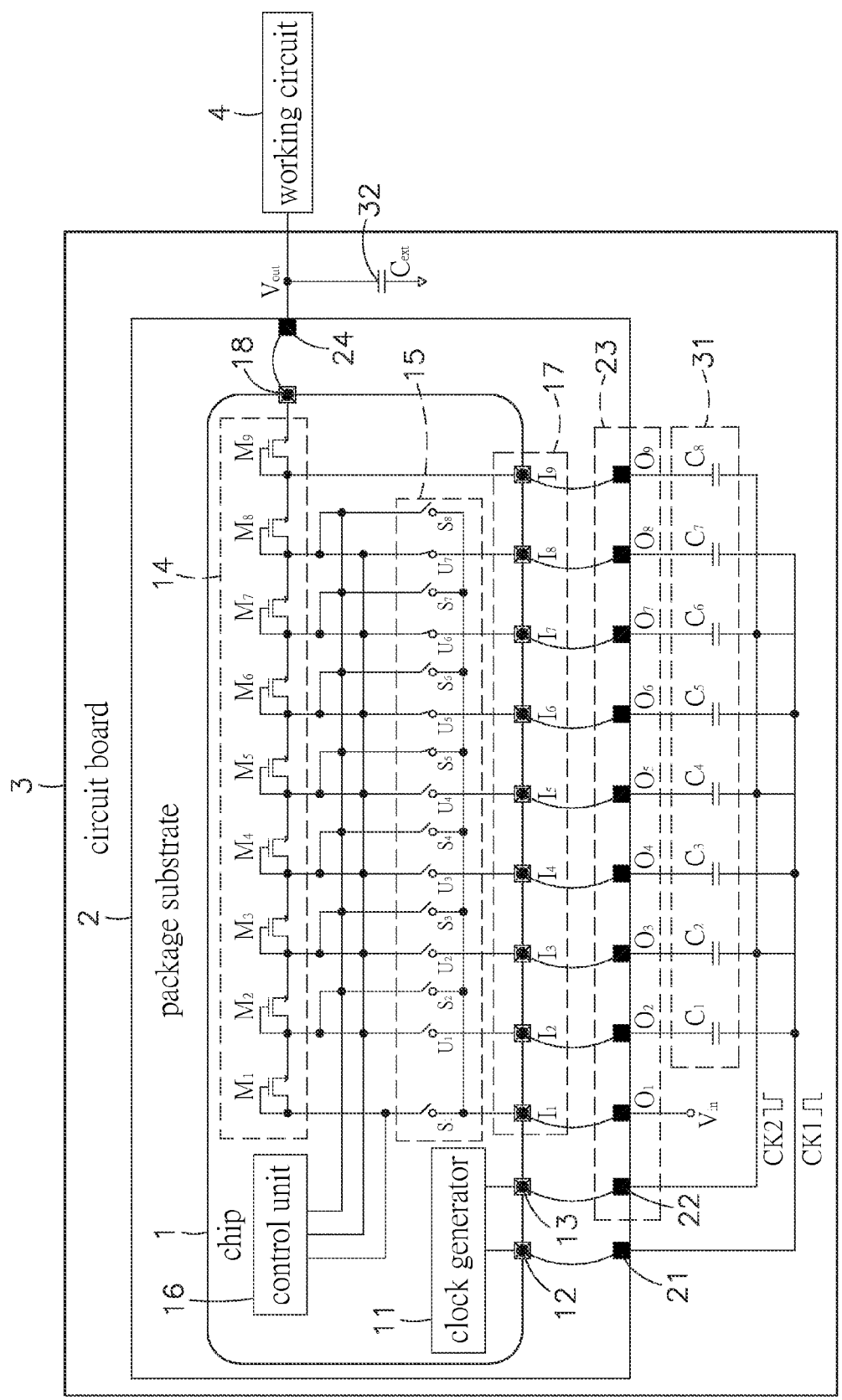
FIG. 2 is a schematic drawing illustrating an applied status of the charge pump in accordance with the present invention.

Referring to FIGS. 1 and 2, a charge pump in accordance with the present invention is shown. The charge pump comprises a chip 1, and a package substrate 2.

The chip 1 comprises a clock generator 11, a first clock terminal 12, a second clock terminal 13, a transistor set 14, a change-over switch set 15, a control unit 16, an input terminal set 17, and an output terminal 18.

The clock generator 11 of the chip 1 is electrically coupled with the first clock terminal 12 and the second clock terminal 13, and adapted for generating a first clock pulse CK1 through the first clock terminal 12 and a reversed second clock pulse CK2 through the second clock terminal 13. The first clock pulse CK1 and the second clock pulse CK2 have the voltage of $V_{DD}$ when at high voltage level, or zero volt when at low voltage level.

The transistor set 14 comprises a first transistor $M_1$, a second transistor $M_2$, a third transistor $M_3$, a fourth transistor $M_4$, a fifth transistor $M_5$, a sixth transistor $M_6$, a seventh transistor $M_7$, an eighth transistor $M_8$ and a ninth transistor $M_9$.

The change-over switch set 15 comprises a first power switch $S_1$, a second power switch $S_2$, a third power switch $S_3$, a fourth power switch $S_4$, a fifth power switch $S_5$, a sixth power switch $S_6$, a seventh power switch $S_7$, an eighth power switch S8, a first capacitor boost switch $U_1$, a second capacitor boost switch $U_2$, a third capacitor boost switch $U_3$, a fourth capacitor boost switch $U_4$, a fifth capacitor boost switch $U_5$, a sixth capacitor boost switch $U_6$, and a seventh capacitor boost switch $U_7$.

The input terminal set 17 comprises a first input terminal $I_1$, a second input terminal $I_2$, a third input terminal $I_3$, a fourth input terminal $I_4$, a fifth input terminal $I_5$, a sixth input terminal $I_6$, a seventh input terminal $I_7$, an eighth input terminal $I_8$, and a ninth input terminal $I_9$.

The collectors of the transistors $M_1$~$M_9$ of the transistor set 14 of the chip 1 are respectively electrically connected to the respective bases thereof; the emitters of the $1^{st}$ through $8^{th}$ transistors $M_1$~$M_8$ are respectively electrically connected to the junctions between the collectors and bases of the $2^{nd}$ through $9^{th}$ transistors $M_2$~$M_9$; the junctions between the collectors and bases of the $1^{st}$ through $8^{th}$ transistors $M_1$~$M_8$ are respectively electrically connected to the respective one ends of the $1^{st}$ through $8^{th}$ power switches $S_1$~$S_8$ of the change-over switch set 15, and the control unit 16 is also electrically coupled with the same respective one ends of the $1^{st}$ through $8^{th}$ power switches $S_1$~$S_8$; the respective other ends of the $1^{st}$ through $8^{th}$ power switches $S_1$~$S_8$ are electrically connected to the first input terminal $I_1$; the junctions between the collectors and bases of the $2^{nd}$ through $8^{th}$ transistors $M_2$~$M_8$ are respectively electrically connected to the respective one ends of the $1^{st}$ through $7^{th}$ capacitor boost switches $U_1$~$U_7$; the control unit 16 is also electrically coupled with the same respective one ends of the $1^{st}$ through $7^{th}$ capacitor boost switches $U_1$~$U_7$; the respective other ends of the $1^{st}$ through $7^{th}$ capacitor boost switches $U_1$~$U_7$ are respectively electrically connected to the $2^{nd}$ through $8^{th}$ input terminals $I_2$~$I_8$; the junctions between the collector and base of the ninth transistor $M_9$ is electrically connected to the ninth input terminal $I_9$; the emitter of the ninth input terminal $I_9$ is electrically connected to the output terminal 18. Further, the $1^{st}$ through $9^{th}$ transistors $M_1$~$M_9$ each have a respective threshold voltage $V_t$.

The package substrate 2 comprises a first clock pin 21, a second clock pin 22, an external pin set 23, and a power output pin 24. The external pin set 23 comprises a $1^{st}$ external pin $O_1$, a $2^{nd}$ external pin $O_2$, a $3^{rd}$ external pin $O_3$, a $4^{th}$ external pin $O_4$, a $5^{th}$ external pin $O_5$, a $6^{th}$ external pin $O_6$, a $7^{th}$ external pin $O_7$, an $8^{th}$ external pin $O_8$, and a $9^{th}$ external pin $O_9$.

Referring to FIG. 2 again, the chip 1 is packaged in the package substrate 2 that is mounted at a circuit board 3 in an electronic apparatus (such as tablet computer, notebook computer, etc.). The circuit board 3 has a $V_{DD}$ input voltage $V_{in}$ (same voltage level as the first clock pulse and the second clock pulse), a capacitor set 31 and a voltage stabilizer capacitor $C_{ext}$. The capacitor set 31 comprises a $1^{st}$ capacitor $C_1$, a $2^{nd}$ capacitor $C_2$, a $3^{rd}$ capacitor $C_3$, a $4^{th}$ capacitor $C_4$, a $5^{th}$ capacitor $C_5$, a $6^{th}$ capacitor $C_6$, a $7^{th}$ capacitor $C_7$, and an $8^{th}$ capacitor $C_8$.

During installation of the present invention, respectively electrically connect the first clock terminal 12 and second clock terminal 13 of the chip 1 to the first clock pin 21 and second clock pin 22 of the package substrate 2, and then respectively electrically connect the input terminals $I_1$~$I_9$ of the chip 1 to the external pins $O_1$~$O_9$ of the package substrate 2, and then electrically connect the first external pin $O_1$ to the input voltage $V_{in}$ of the circuit board 3, and then respectively electrically connect $2^{nd}$ through $9^{th}$ external pins $O_2$~$O_9$ of the package substrate 2 to the respective one ends of the $1^{st}$ through $8^{th}$ capacitors $C_1$~$C_8$ of the capacitor set 31, and then electrically and alternatively connect the respective other ends of the $1^{st}$ through $8^{th}$ capacitors $C_1$~$C_8$ of the capacitor set 31 to the first clock pin 21 and second clock pin 22 of the package substrate 2, i.e., electrically connect the odd number capacitors $C_1$, $C_3$, $C_5$, $C_7$ and $C_9$ to the first clock pin 21 and the even number capacitors $C_2$, $C_4$, $C_6$ and $C_8$ to the second clock pin 22, and then electrically connect the power output pin 24 of the package substrate 2 to a working circuit 4 and one end of the voltage stabilizer capacitor $C_{ext}$ of the circuit board 3, and then electrically connect the other end of the voltage stabilizer capacitor $C_{ext}$ of the circuit board 3 to ground.

Further, the control unit 16 in the chip 1 adjusts the status of the input terminal set 17 subject to the working voltage required by the working circuit 4, for example, if the working voltage of the working circuit 4 is $5 \times (V_{DD}-V_t)$, the control unit 16 will turn on the $5^{th}$ power switch $S_5$ and $5^{th}$ through $7^{th}$ capacitor boost switches $U_5$~$U_7$, enabling the input voltage $V_{in}$ to be boosted by $5^{th}$ through $8^{th}$ capacitors $C_5$~$C_8$ subject to conduction and cutoff of the $5^{th}$ through $9^{th}$ transistors $M_5$~$M_9$, and thereby producing $5 \times (V_{DD}-V_t)$ output voltage $V_{out}$. At this time, the other power switches $S_1$~$S_4$ and $S_6$~$S_8$ and $1^{st}$ through $4^{th}$ capacitor boost switches $U_1$~$U_4$ are in the open-circuit status, and therefore the $1^{st}$ through $4^{th}$ transistors $M_1$~$M_4$ and the $1^{st}$ through $4^{th}$ capacitors $C_1$~$C_4$ are not in use when boosting the input voltage $V_{in}$. In the belowdescribed example, the $5^{th}$ power switch $S_5$ and the $5^{th}$ through $7^{th}$ capacitor boost switches $U_5\sim U_7$ are electrically conducted for producing $5\times(V_{DD}-V_t)$ output voltage $V_{out}$.

In detail, during charging of the $5^{th}$ capacitor $C_5$, the first clock pulse CK1 is at the low voltage level and the second clock pulse CK2 is at the high voltage level, therefore, the $6^{th}$ transistor $M_6$ and $8^{th}$ transistor $M_8$ are electrically disconducted and the $5^{th}$ transistor $M_5$, $7^{th}$ transistor $M_7$ and $9^{th}$ transistor $M_9$ are electrically conducted. At this time, the $V_{DD}$ input voltage $V_{in}$ is conducted through the $5^{th}$ power switch $S_5$ to the $5^{th}$ transistor $M_5$ to produce a threshold $V_t$ voltage drop, and also conducted to the $5^{th}$ capacitor boost switch $U_5$ at one end of the $5^{th}$ capacitor $C_5$ to form a voltage of $(V_{DD}-V_t)$ while the other end of the $5^{th}$ capacitor $C_5$ receives zero volt from the first clock pulse CK1, and thus the $5^{th}$ capacitor $C_5$ is charged to the voltage level of $(V_{DD}-V_t)$.

During boosting of the $5^{th}$ capacitor $C_5$ after the $5^{th}$ capacitor $C_5$ has been charged to the voltage level of $(V_{DD}-V_t)$, the clock pulse CK1 is at the high voltage level and the second clock pulse CK2 is at the low voltage level, therefore, the $5^{th}$ transistor $M_5$, $7^{th}$ transistor $M_7$ and $9^{th}$ transistor $M_9$ are electrically disconducted and the $6^{th}$ transistor $M_6$ and $8^{th}$ transistor $M_8$ are electrically conducted. At this time, one end of the $5^{th}$ capacitor $C_5$ receives the $V_{DD}$ volt from the first clock pulse CK1. Because the $5^{th}$ capacitor $C_5$ has stored therein the voltage of $(V_{DD}-V_t)$, the other end the $5^{th}$ capacitor $C_5$ has a voltage of $(2V_{DD}-V_t)$. Therefore, the voltage of $(2V_{DD}-V_t)$ at the other end the $5^{th}$ capacitor $C_5$ is conducted through the $5^{th}$ capacitor boost switch $U_5$ to the $6^{th}$ transistor $M_6$ to produce a threshold $V_t$ voltage drop, and also conducted to the $6^{th}$ capacitor boost switch $U_6$ at one end of the $6^{th}$ capacitor $C_6$ to form a voltage of $2\times(V_{DD}-V_t)$ while the other end of the $6^{th}$ capacitor $C_6$ receives zero volt from the second clock pulse CK2, and thus the $6^{th}$ capacitor $C_6$ is charged to the voltage level of $2\times(V_{DD}-V_t)$.

Regulation of the voltage of the $7^{th}$ capacitor $C_7$ and $8^{th}$ capacitor $C_8$ can be achieved subject to the aforesaid procedure, i.e., the storage voltages in the $5^{th}$ capacitor $C_5$, $6^{th}$ capacitor $C_6$, $7^{th}$ capacitor $C_7$ and $8^{th}$ capacitor $C_8$ are multiplied to the voltage levels of $(V_{DD}-V_t)$, $2\times(V_{DD}-V_t)$, $3\times(V_{DD}-V_t)$ and $4\times(V_{DD}-V_t)$, and then an output voltage $V_{out}$ at the voltage level of $5\times(V_{DD}-V_t)$ is produced at the power output pin 24 of the package substrate 2 and then stabilized through the voltage stabilizer capacitor $C_{ext}$ and then outputted to the working circuit 4 for working.

In the above-described example, the control unit 16 conducts the $5^{th}$ power switch $S_5$ and the $5^{th}$ through $7^{th}$ capacitor boost switches $U_5\sim U_7$ for enabling the input voltage $V_{in}$ to be multiplied at the $5^{th}$ through $8^{th}$ capacitor $C_5\sim C_8$ to produce $5\times(V_{DD}-V_t)$ output voltage $V_{out}$ subject to conduction and cutoff of the $5^{th}$ transistor $M_5$ through $9^{th}$ transistor $M_9$. Therefore, it can further know the control unit 16 can minimumly adjust the status of each switch of the change-over switch set 15, for example, simply conduct the $8^{th}$ capacitor $C_8$, to let the input voltage $V_{in}$ be boosted by the $8^{th}$ capacitor $C_8$ so as to obtain $2\times(V_{DD}-V_t)$ output voltage $V_{out}$, or alternatively, the control unit 16 can maximumly conduct the $1^{st}$ power switch $S_1$ and the $1^{st}$ through $8^{th}$ capacitor boost switches $U_1\sim U_8$ to let the input voltage $V_{in}$ be boosted by the $1^{st}$ through $8^{th}$ capacitors $C_1\sim C_8$ so as to obtain $9\times(V_{DD}-V_t)$ output voltage $V_{out}$. Therefore, the chip 1 supports the output voltage $V_{out}$ in the range of $2\times(V_{DD}-V_t)\sim 9\times(V_{DD}-V_t)$.

Figure 3:
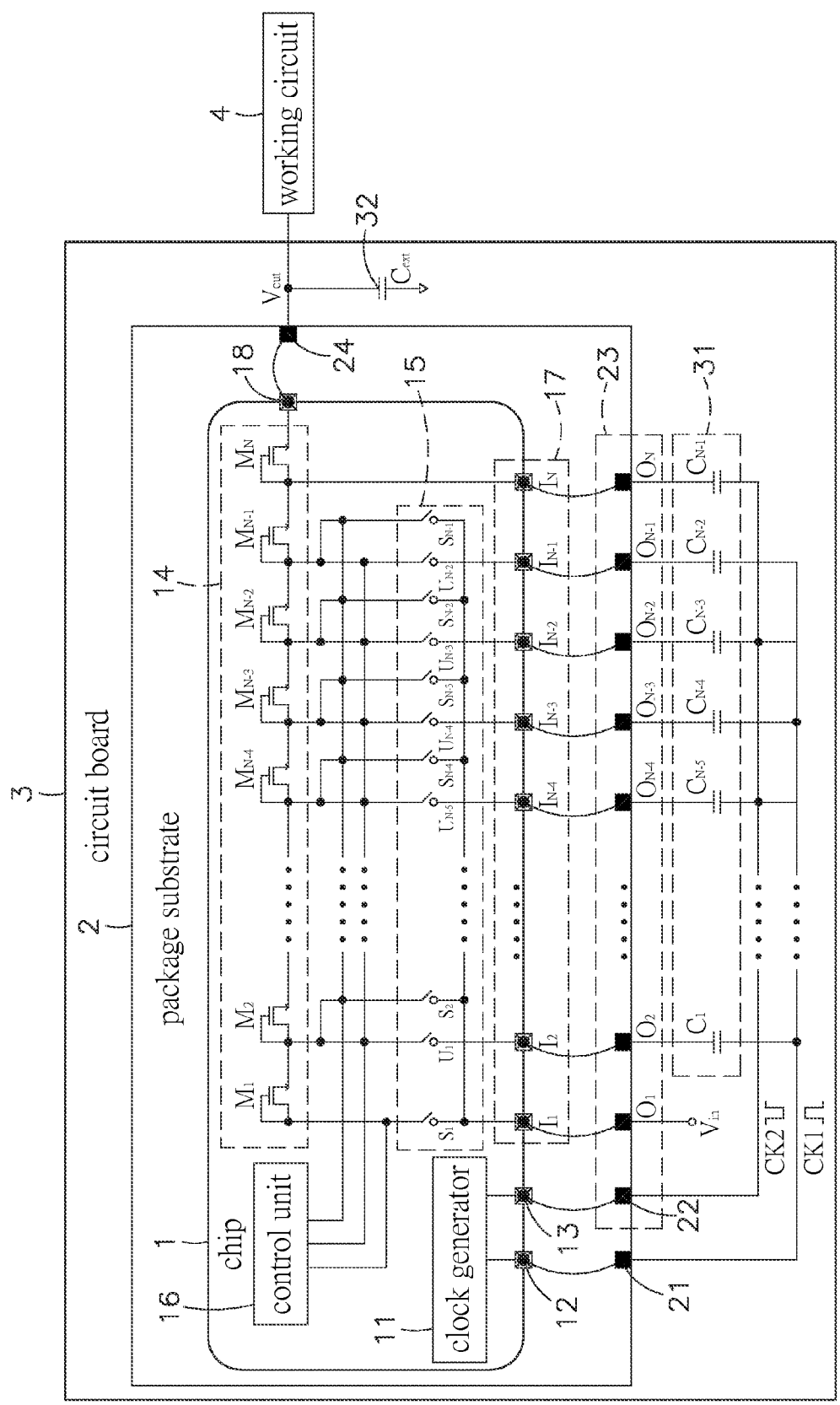
FIG. 3 is a circuit diagram of the charge pump in accordance with the present invention.
Figure 4:
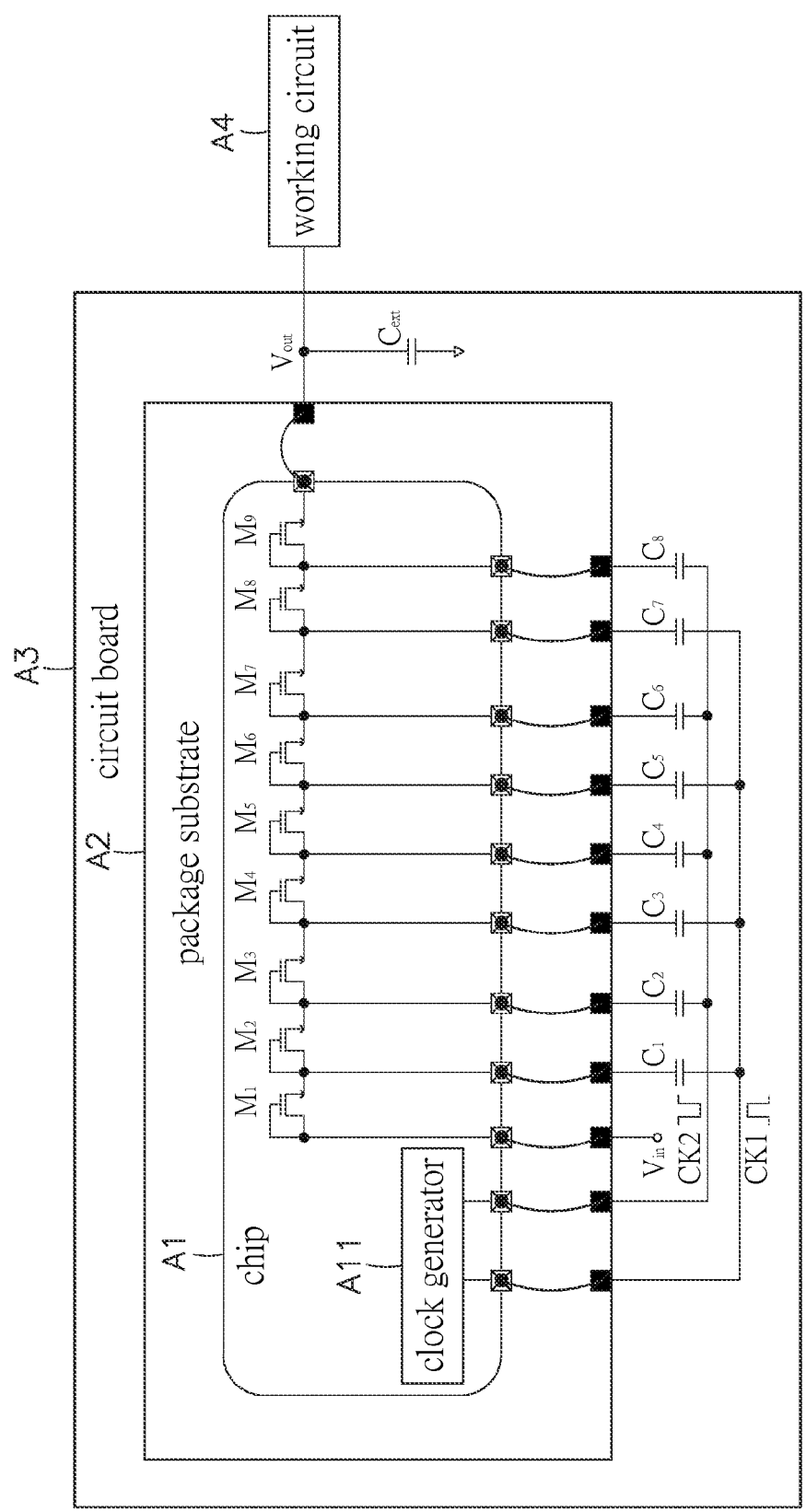
FIG. 4 is a circuit diagram of a charge pump according to the prior art (I).
Figure 5:
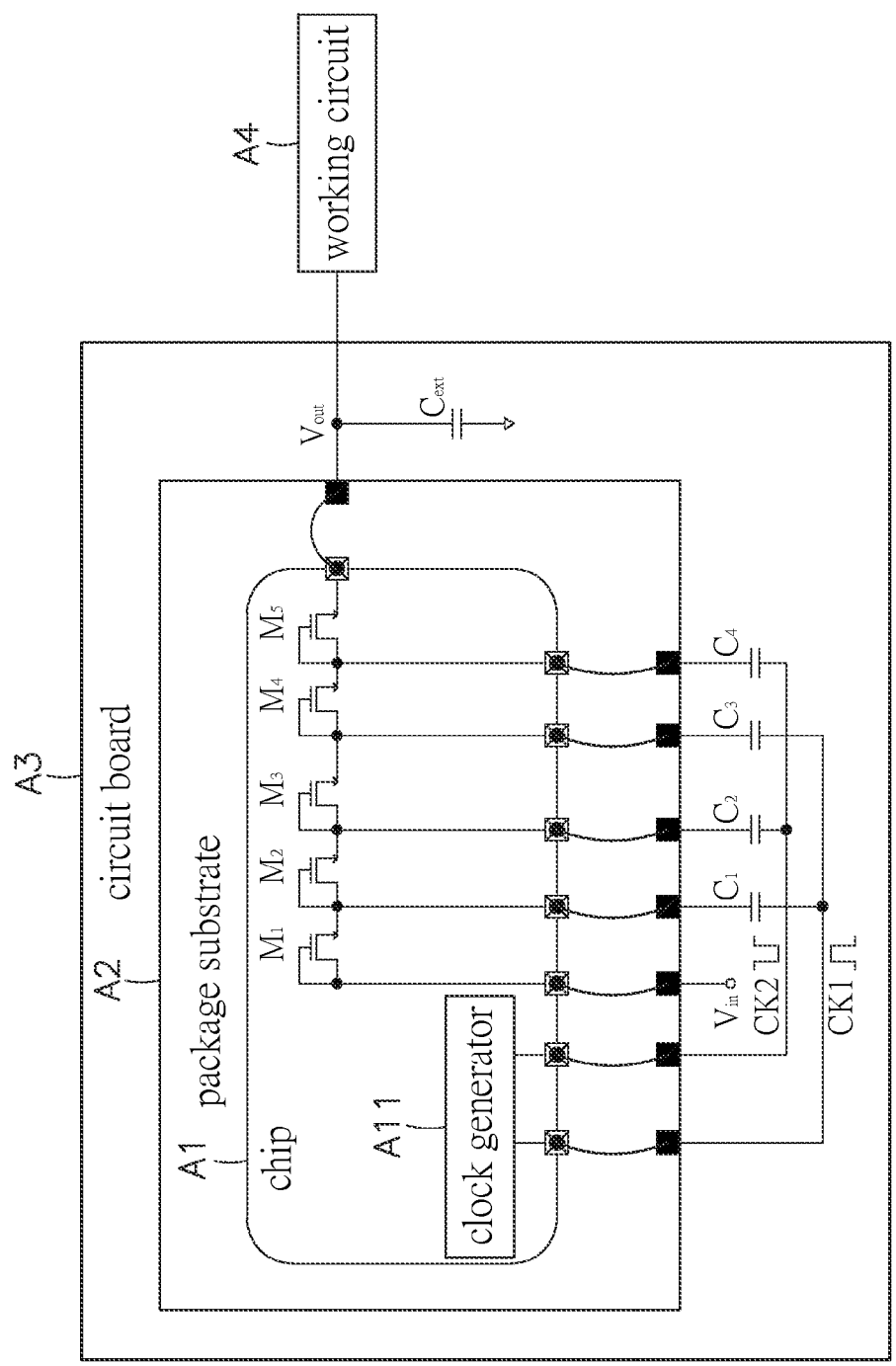
FIG. 5 is a circuit diagram of a charge pump according to the prior art (II).

Referring to FIG. 3, in actual application, the number of the transistors can be adjusted to fit different requirements and is not limited to 9, and the transistor set 14 and input terminal set 17 of the chip 1 can be respectively configured to provide N transistors and N input terminals, wherein $N\geq 4$. Further, the change-over switch set 15 comprises (N−1) power switches and (N−2) capacitor boost switches; the collectors of the transistors $M_1\sim M_N$ are respectively electrically connected to the respective bases; the emitters of $1^{st}$ through $(N-1)^{th}$ transistors $M_1\sim M_{N-1}$ are respectively electrically connected to the junctions between the collectors and bases of the $2^{nd}$ through $N^{th}$ transistors $M_2\sim M_N$; the junctions between the collectors and bases of the $1^{st}$ through $(N-1)^{th}$ transistors $M_1\sim M_{N-1}$ are respectively electrically connected to respective one ends of the first through $(N-1)^{th}$ power switches $S_1\sim S_{N-1}$; the control unit 16 is electrically coupled with the respective same one ends of the first through $(N-1)^{th}$ power switches $S_1\sim S_{N-1}$; the respective other ends of the $1^{st}$ through $(N-1)^{th}$ power switches $S_1\sim S_{N-1}$ are respectively electrically connected to the first input terminal $I_1$; the junctions between the collectors and bases of the $2^{nd}$ through $(N-1)^{th}$ transistors $M_2\sim M_{N-1}$ are respectively electrically connected to respective one ends of the $1^{st}$ through $(N-2)^{th}$ capacitor boost switches $U_1\sim U_{N-2}$; the control unit 16 is electrically coupled with the respective same one ends of the $1^{st}$ through $(N-2)^{th}$ capacitor boost switches $U_1\sim U_{N-2}$; the respective other ends of the $1^{st}$ through $(N-2)^{th}$ capacitor boost switches $U_1\sim U_{N-2}$ are respectively electrically connected to the $2^{nd}$ through $(N-1)^{th}$ input terminal $I_2\sim I_{N-1}$; the junction between the collector and base of the $N^{th}$ transistor $M_N$ is electrically connected to the $N^{th}$ input terminal $I_N$; the emitter of the $N^{th}$ transistor $M_N$ is electrically connected to the output terminal 18.

In actual application, the $1^{st}$ through $N^{th}$ input terminals $I_1\sim I_N$ of the chip 1 are respectively electrically connected to the $1^{st}$ through $N^{th}$ external pins $O_1\sim O_N$ of the external pin set 23 of the package substrate 2; the $1^{st}$ external pin $O_1$ is electrically connected to the input voltage $V_{in}$ of the circuit board 3; $2^{nd}$ through $N^{th}$ external pins $O_2\sim O_N$ of the external pin set 23 of the package substrate 2 are respectively electrically connected to the respective one ends of the $1^{st}$ through $(N-1)^{th}$ capacitors $C_1\sim C_{N-1}$ of the circuit board 3; the respective other ends of the $1^{st}$ through $(N-1)^{th}$ capacitors $C_1\sim C_{N-1}$ of the circuit board 3 are respectively alternatively connected to the first clock pin 21 and the second clock pin 22, i.e., the odd number capacitors $C_1$, $C_3$ etc. are electrically connected to the first clock pin 21 and the even number capacitors $C_1$, $C_3$ etc. are electrically connected to the second clock pin 22.

From the above-described preferred embodiment of the present invention, we can know that, if the working circuit 4 requires the working voltage of $2\times(V_{DD}-V_t)$, the control unit 16 conducts the $(N-1)^{th}$ power switch $S_{N-1}$, enabling $V_{DD}$ input voltage $V_{in}$ to be boosted by the $(N-1)^{th}$ capacitor $C_{N-1}$, and thus, $2\times(V_{DD}-V_t)$ output voltage $V_{out}$ is obtained; if the working circuit 4 requires the working voltage of $5\times(V_{DD}-V_t)$, the control unit 16 conducts the $(N-4)^{th}$ power switch $S_{N-4}$ and the $(N-4)^{th}$ through $(N-2)^{th}$ capacitor boost switches $U_{N-4}\sim U_{N-2}$, enabling $V_{DD}$ input voltage $V_{in}$ to be boosted by the $(N-4)^{th}$ through $(N-1)^{th}$ capacitors $C_{N-4}\sim C_{N-1}$, and thus, $5\times(V_{DD}-V_t)$ output voltage $V_{out}$ is obtained; if the working circuit 4 requires the working voltage of $N\times(V_{DD}-V_t)$, the control unit 16 conducts the $1^{st}$ power switch $S_1$ and the $1^{st}$ through $(N-2)^{th}$ capacitor boost switches $U_1\sim U_{N-2}$, enabling $V_{DD}$ input voltage $V_{in}$ to be boosted by the $1^{st}$ through $(N-1)^{th}$ capacitors $C_1\sim C_{N-1}$, and thus, $N\times(V_{DD}-V_t)$ output voltage $V_{out}$ is obtained. Thus, controlling the control unit 16 to adjust the status of the change-over switch set 17 can provide the desired output voltage $V_{out}$ for the working of the working circuit 4.

As stated above, the output voltage adjustable charge pump of the present invention uses the control unit 16 in the chip 1 to adjust the on/off status of the power switches $S_1\sim S_{N-1}$ and capacitor boost switches $U_1\sim U_{N-2}$ of the change-over switch set 15, enabling the input voltage $V_{in}$ to be boosted by selected capacitors to the desired voltage level subject to conduction and cutoff of selected transistors, and therefore a predetermined voltage level of output voltage $V_{out}$ can be provided to the internal working circuit 4 of any of a variety of predetermined electronic apparatuses without changing the circuit layout of the chip 1 and the package substrate 2. Further, the chip 1 and the package substrate 2 simply need to be verified once, eliminating further verification procedure and operating time prior to vending, and therefore the invention greatly saves the cost.

In general, the invention provides a charge pump, which comprises a chip 1 comprising a clock generator 11, a first clock terminal 12, a second clock terminal 13, a transistor set 14, a change-over switch set 15, a control unit 16, an input terminal set 17 and an output terminal 18, and a package substrate 2 comprising a first clock pin 21, a second clock pin 22, an external pin set 23 and a power output pin 24 and packaged on the chip 1, wherein the control unit 16 of the chip 1 controls On/Off status of the power switches $S_1 \sim S_{N-1}$ and capacitor boost switches $U_1 \sim U_{N-2}$ of the change-over switch set 15, enabling the input voltage $V_{in}$ to be boosted to the desired voltage level subject to conduction and cutoff of selected transistors, and thus the desired voltage level of output voltage $V_{out}$ can be obtained and provided to a working circuit 4.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A charge pump, comprising a chip and a package substrate packaged on said chip and installed in a circuit board comprising an input voltage, N−1 capacitors and a voltage stabilizer capacitor, the capacitors of said circuit board being adapted for storing and boosting said input voltage to provide an output voltage, wherein
   said chip comprises:
   a clock generator for generating a first clock pulse and a reversed second clock pulse;
   a first clock terminal electrically connected to said clock generator for receiving said first clock pulse;
   a second clock terminal electrically connected to said clock generator for receiving said second clock pulse;
   a transistor set comprising N transistors numbered $1^{st}$ through $N^{th}$, said N being ≥4, the collectors of said transistors being respectively electrically connected to the respective bases thereof, the emitters of $1^{st}$ through N−1 transistors being respectively electrically connected to the junctions between the collectors and bases of the $2^{nd}$ through $N^{th}$ transistors;
   a change-over switch set comprising N−1 power switches and N−2 capacitor boost switches, respective one ends of the $1^{st}$ through $(N-1)^{th}$ power switches being respectively electrically connected to junctions between the collectors and bases of the $1^{st}$ through $(N-1)^{th}$ transistors, respective one ends of the $1^{st}$ through $(N-2)^{th}$ capacitor boost switches being respectively electrically connected to junctions between the collectors and bases of the $2^{nd}$ through $(N-1)^{th}$ transistors;
   a control unit electrically connected to respective one ends of the $1^{st}$ through $(N-1)^{th}$ power switches and respective one ends of the $1^{st}$ through $(N-2)^{th}$ capacitor boost switches;
   an input terminal set comprising N input terminals numbered from the $1^{st}$ through $N^{th}$, the first input terminal being electrically connected to respective opposite ends of the $1^{st}$ through $(N-1)^{th}$ power switches, the $2^{nd}$ through $(N-1)^{th}$ input terminals being respectively electrically connected to respective opposite ends of the $1^{st}$ through $(N-2)^{th}$ capacitor boost switches, the $N^{th}$ input terminal being electrically connected to the junction between the collector and base of the $N^{th}$ transistor; and
   an output terminal electrically connected to the emitter of the $N^{th}$ transistor;
   said package substrate comprises:
   a first clock pin electrically connected to said first clock terminal and electrically connected to respective one ends of odd number capacitors of said circuit board;
   a second clock pin electrically connected to said second clock terminal and electrically connected to respective one ends of even number capacitors of said circuit board;
   an external pin set comprising N external pins numbered from $1^{st}$ through $N^{th}$, the $1^{st}$ external pin being electrically connected to said first input terminal and said input voltage, the $2^{nd}$ through $N^{th}$ external pins being respectively electrically connected to $2^{nd}$ through $N^{th}$ input terminals and respective opposite ends of the $1^{st}$ through $(N-1)^{th}$ capacitors; and
   a power output pin electrically connected to said output terminal of said chip.

2. The charge pump as claimed in claim 1, wherein the power output pin of said package substrate is electrically connected to one end of said voltage stabilizer capacitor of said circuit board, and said voltage stabilizer capacitor has an opposite end thereof grounded.

3. The charge pump as claimed in claim 1, wherein the first clock pulse and second clock pulse generated by said clock generator when at a high voltage level have the same voltage level as the voltage level of said input voltage.

4. The charge pump as claimed in claim 1, wherein the first clock pulse and second clock pulse generated by said clock generator have zero volt when at a low voltage level.

\* \* \* \* \*